J. KIRBY.
TROLLEY WIRE CONNECTOR.
APPLICATION FILED MAY 31, 1912.
1,088,707.
Patented Mar. 3, 1914.
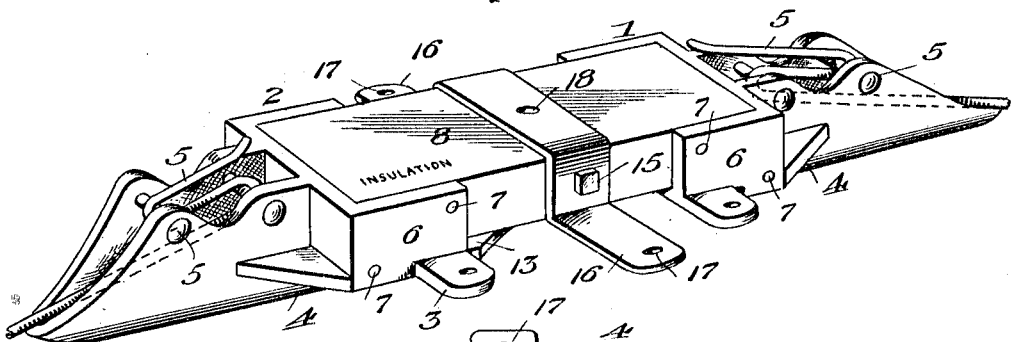
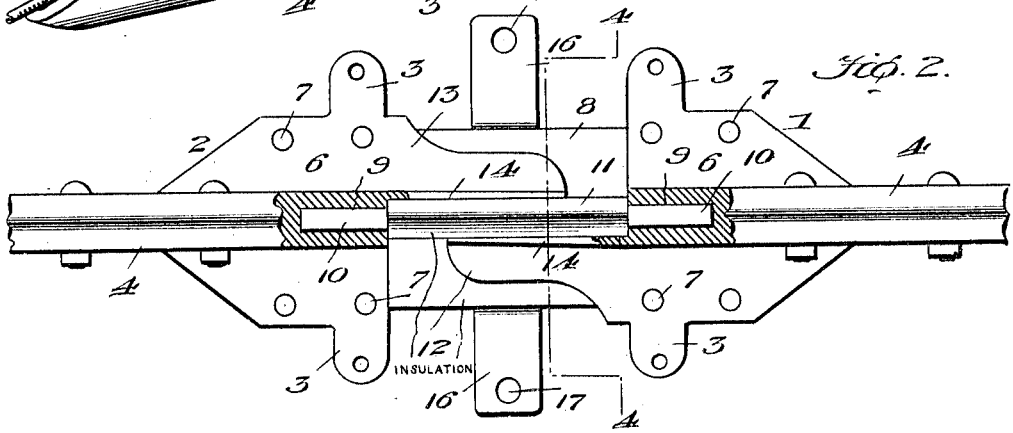
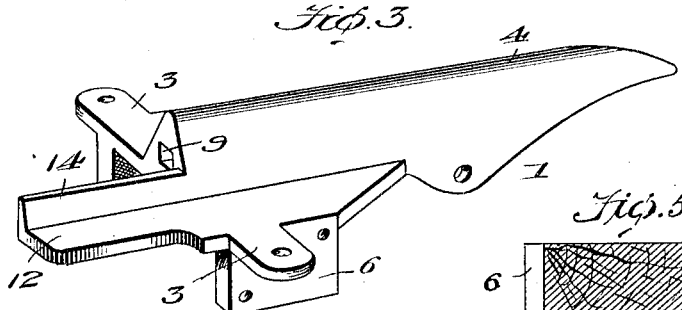
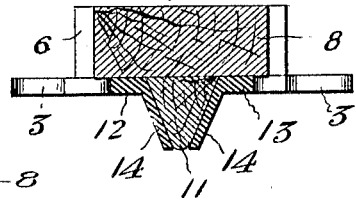
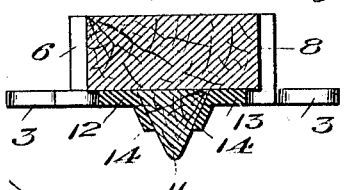
WITNESSES
INVENTOR
John Kirby
by Henry N. Copp
his Attorney ered and and the State of Arizona,of which the following is a specification.

UNITED STATES PATENT OFFICE.

JOHN KIRBY, OF DOUGLAS, ARIZONA.

TROLLEY-WIRE CONNECTOR.

1,088,707.  Specification of Letters Patent.  Patented Mar. 3, 1914.

Application filed May 31, 1912. Serial No. 700,631.

*To all whom it may concern:*

Be it known that I, JOHN KIRBY, a citizen of the United States, residing at Douglas, county of Cochise, and State of Arizona, have invented certain new and useful Improvements in Trolley-Wire Connectors, of which the following is a specification.

My invention relates to trolley wire connectors.

The present invention has for its object the provision of a new trolley wire connector adapted to be used on trolley wire insulator whether a trolley wheel or roller trolley be used, said new connector having means whereby interruption of the current supplied to the motor on the car is prevented while the trolley wheel or roller is passing over the connector, thereby obviating the necessity for shutting off the controller on the car when passing the connector. On roads where the grades are heavy or the load on the car is heavy, it is advantageous to prevent interruption of the current supplied to the car motor except when necessary. In the present invention, provision is made for insulation of the trolley wire terminals from each other at the connector and new means are provided, without interfering with the insulation of the trolley wire terminals, whereby the car is continuously in circuit when the trolley wheel or roller is passing over the connector.

Another object of the invention is the provision of new devices on the insulating bar or member of the connector, whereby the connector is adapted to be hung on either straight lines or curves with equal facility.

The invention consists, first, in the provision of a trolley wire connector having means for the insulation of the wire terminals, combined with means whereby the trolley wheel is continuously kept in electrical circuit with the trolley wire when passing over the connector; second, in the provision of new suspending means on the insulating member of the connector, as will more fully appear hereinafter.

In the accompanying drawings:—Figure 1 is a perspective view; Fig. 2, a bottom plan; Fig. 3, a perspective detail of one of the trolley wire terminal members; Fig. 4, a cross section on line 4—4, Fig. 2, and Fig. 5 a view like Fig. 4, showing a modification.

The trolley wire terminal members 1 and 2 are duplicates, each having a substantially flat bottom, ears 3 for the attachment of anchor or span wires and an integral rib 4 substantially V-shaped in cross-section. On its upper side each terminal has trolley wire connecting means 5. Also, the terminals 1 and 2 have three-sided substantially box-like sockets 6 whose walls are provided with openings for the reception of screws, bolts or other fastenings 7 which connect to the terminals 1 and 2, the flat piece of insulating material, such as wood, 8 whose ends are received in the box-like sockets 6. The inner ends of the ribs 4 are provided with sockets 9 that are square or polygonal in cross-sectional outline and receive reduced ends 10 of the trolley wheel or roller guide 11 which is substantially V-shaped in cross-section, corresponding to the cross-sectional outline of the ribs 4, the shouldered end of the guide 11 substantially abutting the inner ends of the ribs 4. There is thereby provided a continuation of the trolley line across the entire bottom of the connector. Metallic extensions 12 and 13 form a part of the bottoms of the terminals 1 and 2 and lie flat against the lower face of the insulating member 8, these extensions being arranged so that they pass one beyond the other or overlap, but without being in contact, as they are disposed on opposite sides of the guide 11 in spaced relation to each other. The extensions are provided with flanges 14 forming a continuation of the ribs 4. When the motor cars carry a trolley wheel these flanges 14 will be of less height than ribs 4 so that they do not extend to the crest of the guide 11, but they do extend up on opposite sides thereof, the purpose being to afford a greater surface adapted for contact with the trolley wheel so that if the flanges of the trolley wheel do not ride on the flat extensions 12 and 13, the grooved part of the trolley wheel will engage with the flanges 14, whereby contact with the trolley wheel is insured. If the motor cars carry a roller trolley, the flanges 14 will extend to the apex of the guide 11, as shown in Fig. 5, so that the roller trolley will ride on said flanges 14. As the trolley wheel or trolley roller enters the right hand end of the connector, let it be assumed, it travels along the rib 4 and while still in contact with the extension 12 and its flange 14, being thus supplied with current, it runs onto the extension 13 and its flange 14 and finally onto the terminal 2, and rib 4 without interruption of the circuit from the motor on the car, but the terminals 1 and 2 are nevertheless completely insulated from each other.

Secured to the sides of the insulating member 8 by a bolt 15 is the metal strap or clevis 16, the holes 17 of which are adapted to be connected to the span wires, and being centrally located of the length of the connector, the latter may be readily hung on curves, as well as on straight lines in association with span wires or other fastenings attached to the ears or lugs 3. The hole 18 is tapped for a cap and cone to hang the insulator from the line. It being understood that changes in the precise embodiment of invention herein disclosed can be made within the scope of what is claimed without departing from the spirit of the invention.

Having thus described my invention, what I claim as new and desire to secure by Letters Patent, is:—

1. In a trolley wire connector, wire terminals, means for insulating said terminals from each other, said terminals having extensions arranged in relative overlapping position and provided with downwardly extending flanges, an insulated trolley wheel or roller guide on the connector, said downwardly extending flanges being disposed on opposite sides of said guide, the extensions and flanges being arranged so that the trolley wheel or roller will contact with one extension or its flange before passing from the other extension and its flange.

2. In a trolley wire connector, wire terminals, an insulating bar connecting said terminals, extensions on the terminals which lie against the bottom of the insulating bar and are arranged in relative overlapping position and provided with angularly disposed flanges, said extensions with their flanges being separated from each other, a trolley wheel or roller guide of insulating material interposed between the flanges of the said extensions and flanked by them, the said parts being arranged so that the trolley wheel or roller will contact with one extension or its flange before passing from the other extension and its flange.

In testimony whereof, I hereunto affix my signature in presence of two witnesses.

JOHN KIRBY.

Witnesses:
  BOYD W. KINDEL,
  BARNEY HART.

Copies of this patent may be obtained for five cents each, by addressing the "Commissioner of Patents, Washington, D. C."